US012559908B1

(12) United States Patent
Leathers et al.

(10) Patent No.: US 12,559,908 B1
(45) Date of Patent: Feb. 24, 2026

(54) DRIVE SYSTEM WITH A TANDEM DRIVE ASSEMBLY

(71) Applicant: Caterpillar Inc., Peoria, IL (US)

(72) Inventors: Richard Lee Leathers, Decatur, IL (US); Ethan Michael Tevis, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/093,838

(22) Filed: Mar. 28, 2025

(51) Int. Cl.
| | |
|---|---|
| *E02F 9/20* | (2006.01) |
| *B60K 17/36* | (2006.01) |
| *B62D 61/10* | (2006.01) |
| *E02F 3/76* | (2006.01) |
| *E02F 3/84* | (2006.01) |
| *E02F 9/02* | (2006.01) |
| *F16H 37/02* | (2006.01) |
| *F16H 37/06* | (2006.01) |
| *F16H 37/08* | (2006.01) |
| *F16H 57/035* | (2012.01) |
| *F16H 61/662* | (2006.01) |

(52) U.S. Cl.
CPC .............. *E02F 9/202* (2013.01); *B60K 17/36* (2013.01); *B62D 61/10* (2013.01); *E02F 3/7663* (2013.01); *E02F 3/84* (2013.01); *E02F 9/02* (2013.01); *F16H 37/021* (2013.01); *F16H 37/065* (2013.01); *F16H 37/0846* (2013.01); *F16H 57/035* (2013.01); *F16H 61/662* (2013.01); *B60Y 2200/1422* (2013.01); *B60Y 2400/72* (2013.01); *E02F 3/7636* (2013.01); *E02F 3/841* (2013.01)

(58) Field of Classification Search
CPC ..... E02F 9/202; E02F 9/20; E02F 9/02; E02F 3/7636; E02F 3/76; E02F 3/841; E02F 3/84; E02F 3/7663; F16H 37/021; F16H 37/02; F16H 37/065; F16H 37/06; F16H 37/084; F16H 37/0846; F16H 57/035; F16H 61/66; F16H 61/662; B60K 17/36; B62D 61/10; B60Y 2200/1422; B60Y 2400/72; B60Y 2200/444
USPC .................. 180/366, 24.11, 24.12, 22, 24.08; 172/781
See application file for complete search history.

(56) References Cited

U.S. PATENT DOCUMENTS

| | | | | |
|---|---|---|---|---|
| 3,454,109 A | * | 7/1969 | Roberts ................. | B60K 17/36 |
| | | | | 180/24.04 |
| 4,359,914 A | | 11/1982 | Meisel | |
| 6,364,041 B1 | * | 4/2002 | Vangsgard ............. | B60G 11/23 |
| | | | | 280/124.13 |
| 6,601,665 B2 | * | 8/2003 | Hurlburt ............... | B62D 61/10 |
| | | | | 280/492 |
| 9,358,880 B2 | | 6/2016 | Bindl | |
| 10,106,010 B2 | * | 10/2018 | Fliearman ............. | E02F 3/7636 |
| 11,820,223 B2 | | 11/2023 | Fliearman et al. | |
| 2004/0245029 A1 | * | 12/2004 | Irikura ................. | B62D 11/005 |
| | | | | 180/6.24 |

(Continued)

*Primary Examiner* — Keith J Frisby

(57) ABSTRACT

A tandem drive assembly includes a tandem housing, a first drive sprocket and a second drive sprocket arranged in the tandem housing and configured to engage a pair of wheels, and a continuously-variable drive. The continuously-variable drive is arranged in the tandem housing. The continuously-variable drive includes an input configured to receive power from a prime mover and an output coupled to the first drive sprocket. The output is operatively connected to the input.

20 Claims, 6 Drawing Sheets

(56) References Cited

U.S. PATENT DOCUMENTS

| 2009/0071737 | A1* | 3/2009 | Leonard | .................. | B60L 58/21 |
| | | | | | 296/182.1 |
| 2011/0024222 | A1* | 2/2011 | Honzek | .................. | B60K 6/543 |
| | | | | | 180/383 |
| 2016/0144712 | A1* | 5/2016 | Olli | ........................ | B62D 61/10 |
| | | | | | 180/24.08 |
| 2016/0178041 | A1 | 6/2016 | Hagman | | |
| 2019/0016216 | A1* | 1/2019 | Sundberg | ............... | B60K 17/36 |
| 2019/0337384 | A1* | 11/2019 | Matsushita | ............ | B60K 17/08 |
| 2020/0325964 | A1* | 10/2020 | Kimes | ..................... | F16H 3/728 |
| 2025/0034835 | A1* | 1/2025 | Vahling | ................. | E02F 3/7663 |

* cited by examiner

DRIVE SYSTEM WITH A TANDEM DRIVE ASSEMBLY

TECHNICAL FIELD

The present disclosure relates generally to work machines and, for example, to a drive system with a tandem drive assembly.

BACKGROUND

A construction machine, such as a motor grader, may be used in road construction and maintenance for displacing, distributing, and leveling material, such as, soil, gravel, snow, and the like. For example, a motor grader may shape or level a ground surface by forcing an implement, such as a blade, to bear against the ground surface over which the motor grader is driven. The construction machine includes a drive system that may propel the construction machine relative to the ground surface. The drive system may have difficulty propelling the construction machine relative to the ground surface on challenging terrain. Additionally or alternatively, the drive system may occupy a region of the construction machine that interferes with other systems of the construction machine.

The drive system of the present disclosure solves one or more of the problems set forth above and/or other problems in the art.

SUMMARY

A tandem drive assembly may include a tandem housing, a first drive sprocket and a second drive sprocket arranged in the tandem housing and configured to engage a pair of wheels, and a continuously-variable drive. The continuously-variable drive is arranged in the tandem housing. The continuously variable drive includes an input configured to receive power from a prime mover and an output coupled to the first drive sprocket. The output is operatively connected to the input.

A drive system may include a first tandem drive assembly, a second tandem drive assembly, and an axle. The first tandem drive assembly includes a first input and a first output operatively connected to the first input. The second tandem drive assembly includes a second input and a second output operatively connected to the second output. The axle is operatively coupled to the first input and the second input.

A motor grader may include a steerable front portion coupled to a driven rear portion, a prime mover supported on the driven rear portion, a pair of rear wheels supporting the driven rear portion, and a tandem drive assembly. The tandem drive assembly includes a tandem housing, a first drive sprocket and a second drive sprocket arranged in the tandem housing and engaging the pair of rear wheels, and a continuously-variable drive arranged in the tandem housing. The continuously-variable drive is configured to receive power from the prime mover and is configured to drive at least one of the first drive sprocket or the second drive sprocket.

DETAILED DESCRIPTION

This disclosure relates to a drive system, which is applicable to any machine that uses a tandem drive. For example, the machine may be a vehicle, a motor grader, a compactor machine, a paving machine, a cold planer, a grading machine, a backhoe loader, a wheel loader, a harvester, an excavator, a skid steer loader, a tractor, a dozer, or the like.

Figure 1:
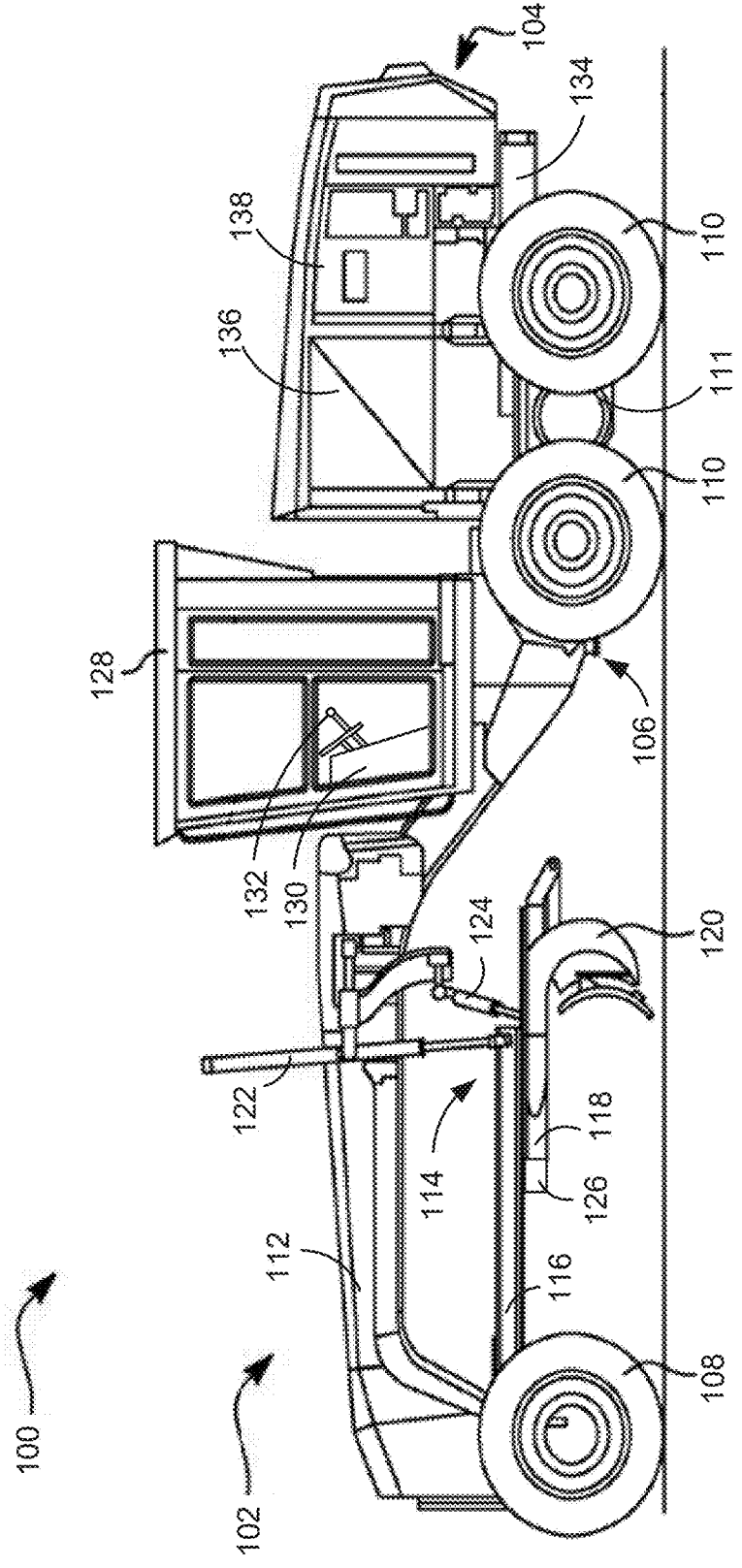
FIG. 1 is a side elevational view of an example machine.

FIG. 1 is a side elevational view of an example machine 100. The machine 100 is a work machine. FIG. 1 shows an example where the machine 100 is a motor grader. However, as described above, the machine 100 may be any machine that uses a tandem drive.

The machine 100 includes a steerable front portion 102 and a driven rear portion 104. An articulated joint 106 (e.g., which includes a hinge) may be between the front portion 102 and the rear portion 104 to permit the front portion 102 and the rear portion 104 to articulate relative to each other. The front portion 102 and the rear portion 104 are supported on front ground engaging members and rear ground engaging members, respectively, which are shown as a pair of front wheels 108 (only a left-side wheel 108 is visible in FIG. 1), supporting the front portion 102, and one or more pairs of rear wheels 110 (only left-side wheels 110 are visible in FIG. 1) supporting the rear portion 104. Alternatively, the ground engaging members may include one or more track assemblies, or the like. Rear wheels 110 may be operated by a tandem drive assembly 111 that is connected to the driven rear portion 104.

The front portion 102 includes a front frame section 112. A linkage assembly 114 is mounted to the front frame section 112 and may be utilized for grading. The linkage assembly 114 includes a drawbar 116 pivotably mounted to the front frame section 112 (e.g., via a ball joint (not shown)), a circle 118 connected to the drawbar 116, and a ground-engaging implement 120, such as a blade or a moldboard, connected to the circle 118 (e.g., the linkage assembly 114 may include a drawbar-circle-moldboard assembly). A position of the drawbar 116 may be controlled by lift cylinders 122 (only one of which is visible in FIG. 1) and a drawbar centershift cylinder 124. The lift cylinders 122 may control raising and lowering of the implement 120 relative to a ground surface, and/or tilting of the implement 120 relative to the ground surface (e.g., when lift cylinders 122 are operated independently of each other). The drawbar centershift cylinder 124 may control lateral shifting of the implement 120 relative to the front frame section 112. An angular position of the circle 118 may be controlled by a circle drive motor 126 (e.g., a hydraulic motor). For example, the circle 118 may include a plurality of gear teeth engaged with a gear coupled to the circle drive motor 126. The circle drive motor 126 may control an angle of the implement 120 relative to the front frame section 112 by rotation of the circle 118.

A position of the implement 120 may be controlled by a blade pitch cylinder (not shown) and/or a blade sideshift cylinder (not shown). The blade pitch cylinder may control a forward or a rearward rotation of a top edge of the implement 120. The blade sideshift cylinder may control lateral shifting of the implement 120 relative to the front frame section 112. Accordingly, the linkage assembly 114 enables the implement 120 to be moved to a variety of different positions.

The machine 100 may include an operator cab 128. The operator cab 128 may include a console 130 and one or more operator controls 132. The console 130 may include a display, a touchscreen display, and/or one or more operating mode selectors (e.g., buttons, switches, or the like). The operator controls 132 may include a steering mechanism, a speed-throttle, a control lever, a joystick, a touchscreen control, or the like. An operator occupying the operator cab 128 can control various functions of the machine 100 using the console 130 and/or the operator controls 132.

The rear portion 104 includes a rear frame section 134. A prime mover 136 is supported on the rear frame section 134. The prime mover 136 may include an engine (e.g., an internal combustion engine), such as a diesel engine, a gasoline engine, or a gaseous fuel engine, among other examples. Additionally, or alternatively, the prime mover 136 may include an electric motor (e.g., for electric powering of machine 100 or hybrid powering of machine 100 with the engine). The prime mover 136 is configured to propel the machine 100 via the rear wheels 110. The prime mover 136 may be coupled to a hydraulic system 138. The hydraulic system 138 may include one or more pumps (not visible) to drive or power operations of the machine 100, such as steering of the wheels 108 or the wheels 110, or movement of the linkage assembly 114 to control a position of the implement 120.

As indicated above, FIG. 1 is provided as an example. Other examples may differ from what is described with regard to FIG. 1.

Figure 2:
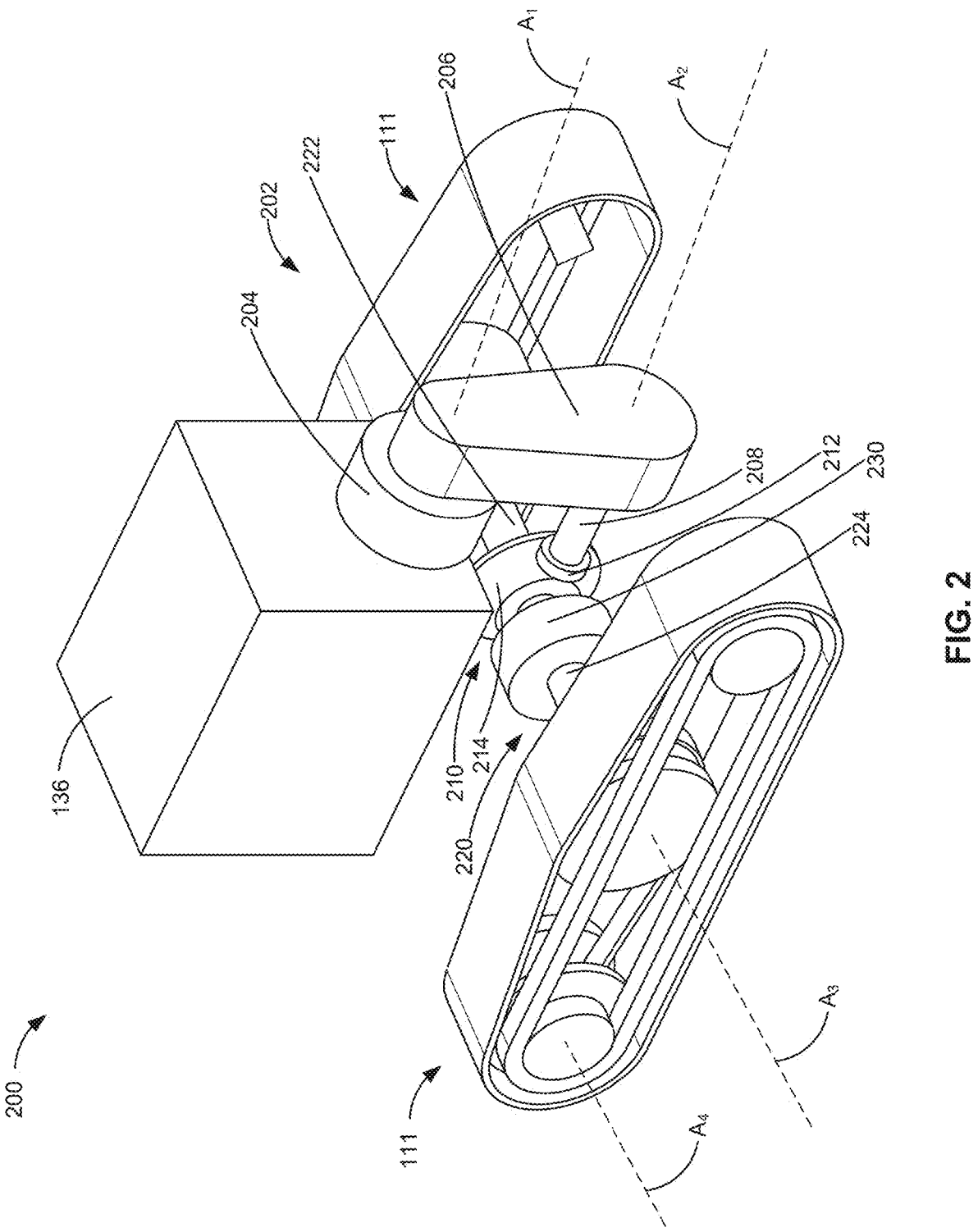
FIG. 2 is a perspective view of an example power train of the machine of FIG. 1.

FIG. 2 is a perspective view of an example power train 200 of the machine 100. Some parts of the power train 200 are shown as simplified representations for illustration purposes.

The power train 200 is configured to operate the rear wheels 110 to drive the rear portion 104 of the machine 100. In some examples, the power train 200 is additionally or alternatively configured to operate the front wheels 108 to drive the front portion 102 of the machine 100.

The power train 200 includes the prime mover 136 and a drive system 202. The drive system 202 is configured to transfer power (e.g., motive power, torque) between the prime mover 136 and the rear wheels 110 to propel the machine 100. The drive system 202 includes a pair of the tandem drive assemblies 111 that each transfer power between the prime mover 136 and a portion of the rear wheels 110. For example, the drive system 202 may include a first of the tandem drive assemblies 111 on a first side of the machine 100 that transfers power from the prime mover 136 to the rear wheels 110 positioned on the first side of the machine 100 and a second of the tandem drive assemblies 111 on an opposing second side of the machine 100 that transfers power from the prime mover 136 to the rear wheels 110 positioned on the second side of the machine 100.

The drive system 202 includes a transfer system 204 coupled to the prime mover 136. The transfer system 204 may include a torque convertor and/or a planetary gear box. The transfer system 204 is driven by the prime mover 136 to transfer power from the prime mover 136 to the transfer system 204. As the transfer system 204 is driven by the prime mover 136, the transfer system 204 rotates about a first axis $A_1$. For example, the power transferred from the prime mover 136 to the transfer system 204 may drive the transfer system 204 to rotate about the first axis $A_1$. The first axis $A_1$ may extend along the transfer system 204.

The drive system 202 includes a drop box assembly 206 coupled to the transfer system 204. The drop box assembly 206 is driven by the transfer system 204 to transfer the power received from the transfer system 204. As the drop box assembly 206 is driven by the transfer system 204, the drop box assembly 206 offsets the rotation associated with the power received by the drop box assembly 206 from the transfer system 204 away from the first axis $A_1$. By transferring the power from the transfer system 204, the drop box assembly 206 may offset the rotation associated with the power received from the transfer system 204 from the first axis $A_1$ to a second axis $A_2$ offset from the first axis $A_1$. The second axis $A_2$ may be substantially parallel to the first axis $A_1$. For example, the drop box assembly 206 may transfer rotation associated with the power received from the transfer system 204 from the first axis $A_1$ to the second axis $A_2$ positioned below the first axis $A_1$. The drop box assembly 206 may include a gearbox system, a belt and sprocket system, a chain and sprocket system, or another suitable system to transfer the rotation associated with the power received from the transfer system 204 from the first axis $A_1$ to the second axis $A_2$.

The drive system 202 includes a drop shaft 208 coupled to the drop box assembly 206. The drop shaft 208 is driven by the drop box assembly 206 to transfer power from the drop box assembly 206 to the drop shaft 208. As the drop shaft 208 is driven by the drop box assembly 206, the drop shaft 208 rotates about the second axis $A_2$. For example, the power transferred from the drop box assembly 206 to the drop shaft 208 may drive the drop shaft 208 to rotate about the second axis $A_2$. The second axis $A_2$ may extend along the drop shaft 208.

The drive system 202 includes a bevel gear assembly 210 coupled to the drop shaft 208. The bevel gear assembly 210 is driven by the drop shaft 208 to transfer power from the drop shaft 208 to the bevel gear assembly 210. As the bevel gear assembly 210 is driven by the drop shaft 208, the bevel gear assembly 210 offsets the rotation associated with the power received by the bevel gear assembly 210 away from the second axis $A_2$. By transferring the power from the drop shaft 208, the bevel gear assembly 210 may offset the rotation associated with the power received from the drop shaft 208 from the second axis $A_2$ to a third axis $A_3$ offset (e.g., rotationally offset) from the second axis $A_2$ and/or the first axis $A_1$. The third axis $A_3$ may be substantially perpendicular to the second axis $A_2$.

The bevel gear assembly 210 includes a pinion gear 212 coupled to the drop shaft 208 and a bevel gear 214 engages the pinion gear 212 such that the pinion gear 212 transfers power received from the drop shaft 208 to the bevel gear 214. The pinion gear 212 drives the bevel gear 214 to transfer rotation associated with the power received from the drop shaft 208 from the second axis $A_2$ to the third axis $A_3$. For example, the drop shaft 208 may drive the pinion gear 212 to rotate about the second axis $A_2$ and the pinion gear 212 may drive the bevel gear 214 to rotate about the third axis $A_3$. In other examples, the drive system 202 includes another assembly to transfer torque about the second axis $A_2$ received from the drop shaft 208 to the third axis $A_3$ (e.g., a worm gear assembly, a 90 degree gearbox).

The drive system 202 includes an axle 220 coupled to the bevel gear assembly 210. The axle 220 is driven by the bevel gear assembly 210 to transfer power from the bevel gear assembly 210 to the axle 220. For example, the bevel gear 214 may be coupled to the axle 220 to drive the axle 220 using power received by the bevel gear 214 from the pinion gear 212. As the axle 220 is driven by the bevel gear assembly 210, the axle 220 rotates about the third axis A₃. For example, the power transferred from the bevel gear assembly 210 to the axle 220 may drive the axle 220 to rotate about the third axis A₃. The third axis A₃ may extend along the axle 220. In some examples, the portion of the drive system 202 between the prime mover 136 and the axle 220 may have a different configuration from the configuration described herein, provided that it functions to transfer power from the prime mover 136 to the axle 220.

The axle 220 includes a first axle section 222 coupled to the bevel gear assembly 210, a second axle section 224, and a torsional damper 230 coupling the first axle section 222 and the second axle section 224. The torsional damper 230 is configured to facilitate an angular offset between the first axle section 222 and the second axle section 224 during rotation of the axle 220. For example, the torsional damper 230 may facilitate the first axle section 222 rotating a first angle about the third axis A₃ and the second axle section 224 rotating a second angle about the third axis A₃ that is different from the first angle. The torsional damper 230 may allow for the rear wheels 110 positioned on a first side of the machine 100 to rotate separately from the rear wheels 110 positioned on an opposing second side of the machine 100. Additionally or alternatively, the torsional damper 230 may decrease torques between the first axle section 222 and the second axle section 224 relative to if the second axle section 224 was directly coupled to the first axle section 222. In some example, the torsional damper 230 may be biased to reduce the angular offset between the first axle section 222 and the second axle section 224. For example, when there is an angular offset between the first axle section 222 and the second axle section 224, the torsional damper 230 may apply a torque on the first axle section 222 and/or the second axle section 224 that causes a reduction in the angular offset.

The tandem drive assemblies 111 are coupled to the axle 220. The tandem drive assemblies 111 are driven by the axle 220 to transfer power from the axle 220 to the tandem drive assemblies 111. For example, the first axle section 222 may be coupled to a first of the tandem drive assemblies 111 to provide power from the first axle section 222 to the first of the tandem drive assemblies 111 and the second axle section 224 may be coupled to a second of the tandem drive assemblies 111 to provide power from the second axle section 224 to the second of the tandem drive assemblies 111.

As indicated above, FIG. 2 is provided as an example. Other examples may differ from what is described with regard to FIG. 2.

Figure 3:
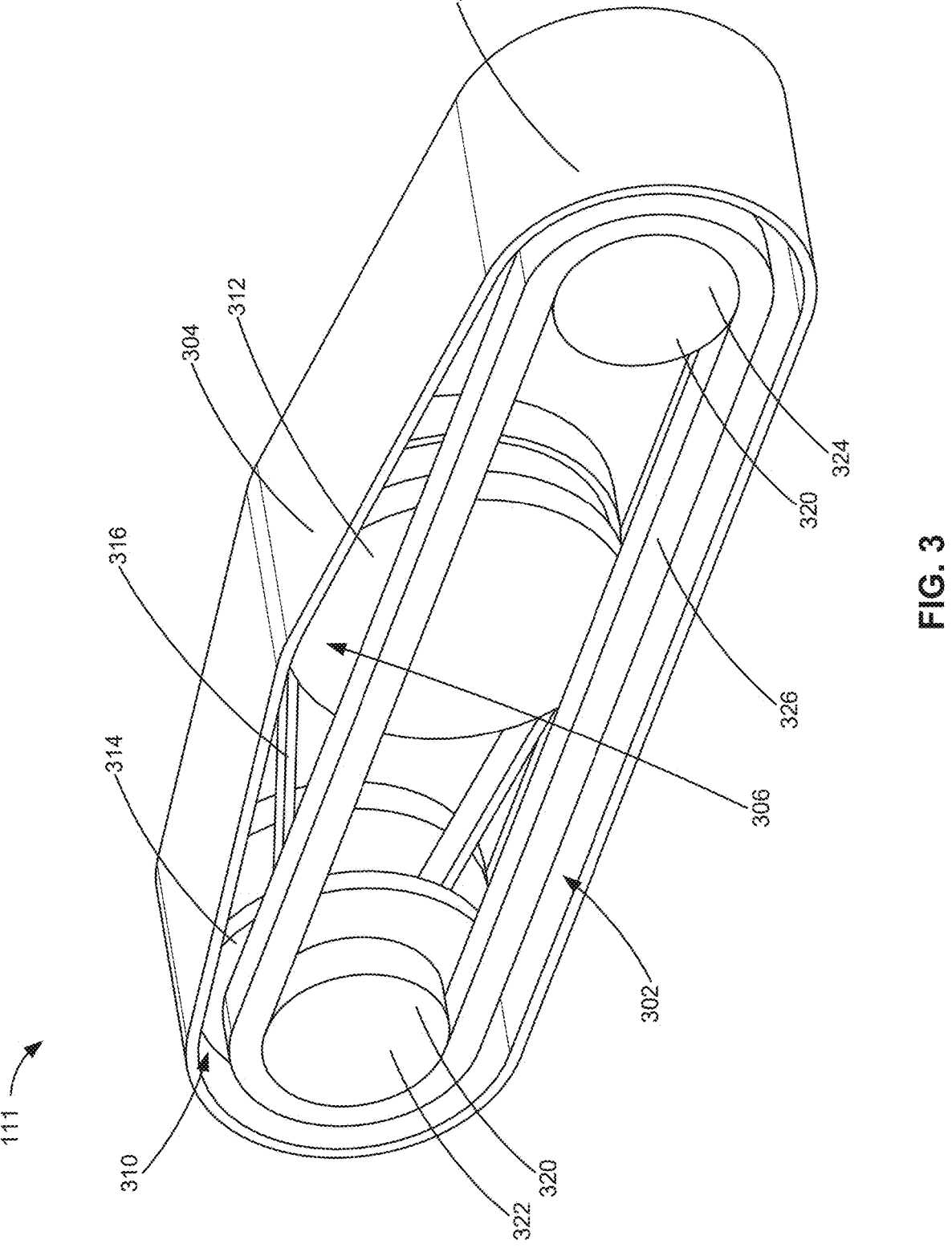
FIG. 3 is a perspective view of an example tandem drive assembly of the power train of FIG. 2.
Figure 4:
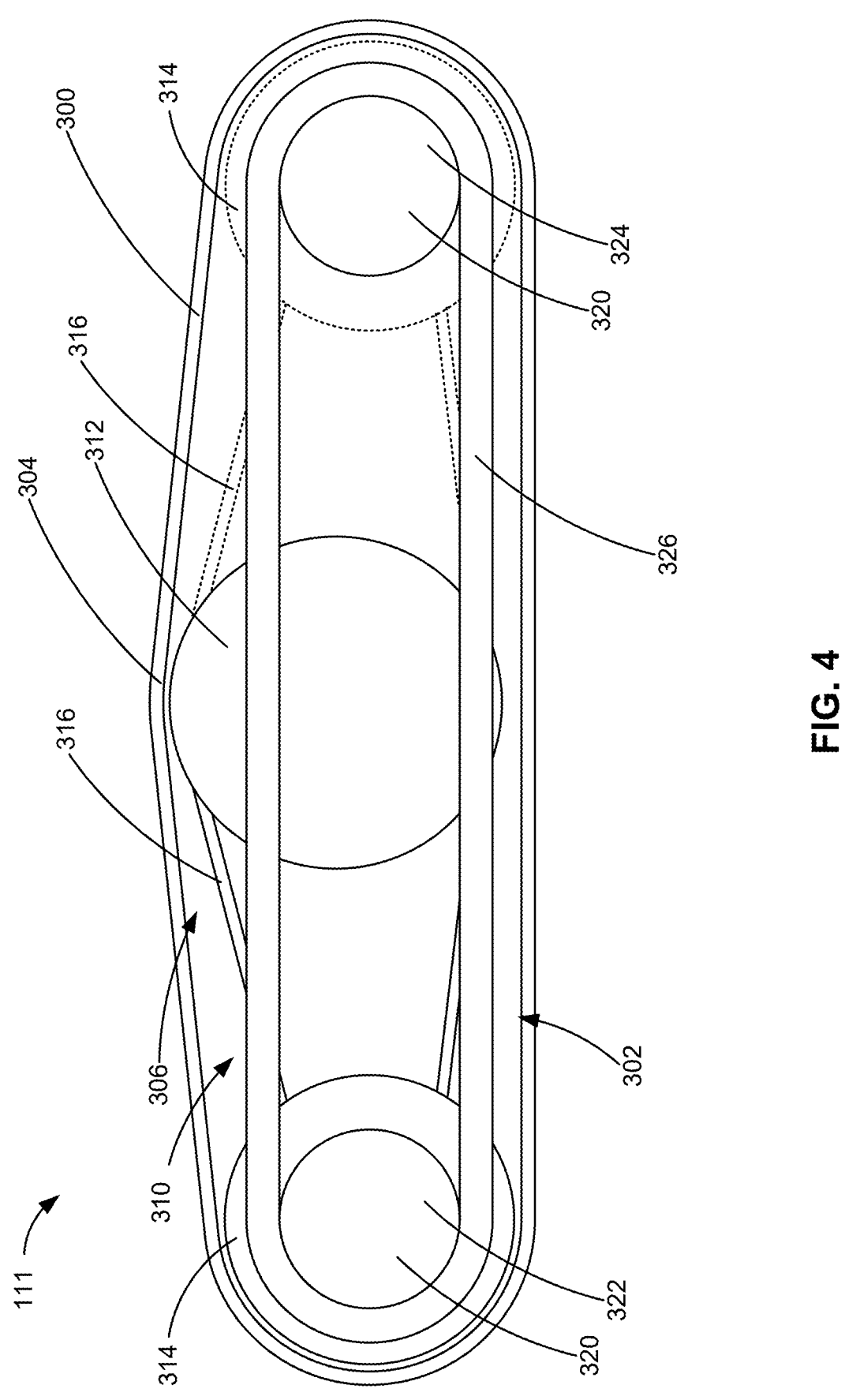
FIG. 4 is a side view of the tandem drive assembly of FIG. 3.

FIGS. 3 and 4 show an example of one of the tandem drive assemblies 111. In particular, FIG. 3 is a perspective view of the tandem drive assembly 111 and FIG. 4 is a side view of the tandem drive assembly 111.

The tandem drive assemblies 111 are configured to transfer power from the axle 220 to the rear wheels 110 to propel the machine 100. The tandem drive assemblies 111 are continuously-variable tandem drive assemblies that selectively adjust a gear ratio between the axle 220 and the rear wheels 110. By way of example, the tandem drive assemblies 111 may selectively adjust the gear ratio between the axle 220 and the rear wheels 110 to any one of a substantially infinite number of gear ratios between a maximum gear ratio of the tandem drive assemblies 111 and a minimum gear ratio of the tandem drive assemblies 111.

The tandem drive assemblies 111 each include a tandem housing 300 configured to receive (e.g., contain, house) other components of the tandem drive assemblies 111. For example, the tandem housings 300 may be configured to receive each of the other components of the tandem drive assemblies 111. The tandem housings 300 may be coupled to the rear frame section 134 of the machine 100. The tandem housings 300 each define a tandem housing opening 302 configured to receive other components of the tandem drive assemblies 111.

In some examples, the tandem housings 300 each include a raised portion 304 extending upward from the tandem housing opening 302. The raised portions 304 may each define a raised tandem housing opening portion 306 of the tandem housing opening 302.

The tandem drive assemblies 111 each include a continuously-variable drive 310 (e.g., a continuously-variable transmission) arranged in the tandem housings 300. For example, the continuously-variable drives 310 may be received within the tandem housing openings 302 of the tandem housings 300. The continuously-variable drives 310 are coupled to the axle 220. The continuously-variable drives 310 are driven by the axle 220 to transfer power from the axle 220 to the continuously-variable drives 310. For example, a first of the continuously-variable drives 310 may be coupled to the first axle section 222 to receive power from the first axle section 222 and a second of the continuously-variable drives 310 may be coupled to the second axle section 224 to receive power from the second axle section 224.

When the continuously-variable drives 310 are arranged in the tandem housings 300, other components of the machine 100 may be positioned in and/or routed through a region located between the tandem housings 300. For example, the continuously-variable drives 310 may be positioned outside of the region between the tandem housings 300 to allow for other components (e.g., hydraulic systems, cooling systems, emission systems) of the machine 100 to be positioned within the region between the tandem housings 300. The region located between the tandem housings 300 may be positioned under the prime mover 136.

The continuously-variable drives 310 selectively adjust a gear ratio between the axle 220 and the rear wheels 110. In some examples, the continuously-variable drives 310 are pulley-based continuously variable transmissions (CVTs). In other examples, the continuously-variable drives 310 are hydraulic CVTs, hydro-mechanical CVTs, electric CVTs, hydrostatic CVTs, toroidal CVTs, or any other configuration that allows for the continuously-variable drives 310 to selectively adjust the gear ratio between the axle 220 and the rear wheels 110. In still other examples, the continuously-variable drives 310 may be utilized in offset drive systems where an axle is offset from the rear wheels 110 (e.g., an axis of the axle 220 is offset from the rear wheels 110). For example, the continuously-variable drives 310 may each operatively connect the axle of an offset drive system to one of the rear wheels 110 to provide power from the axle to the rear wheels 110 while adjusting the gear ratio between the axle and the rear wheels 110.

The continuously-variable drives 310 may each have an input and an output, shown as an input pulley 312 and an output pulley 314 in the pulley-driven continuously-variable drive example shown in FIGS. 3 and 4. In other examples of the continuously-variable drives 310, the input and the output may be gears, axles, sprockets, and/or other means for receiving torque from the axle 220 and providing torque to the rear wheels 110 that allow for the continuously-variable drives 310 to selectively adjust the gear ratio between the axle 220 and the rear wheels 110.

The input pulleys 312 are each coupled to the axle 220. The input pulleys 312 may each be coupled to an end of the axle 220. For example, a first of the input pulleys 312 of a first of the continuously-variable drives 310 may be coupled to a first end of the axle 220 and a second of the input pulleys 312 of a second of the continuously-variable drives 310 may be coupled to an opposing second end of the axle 220.

The input pulleys 312 of the continuously-variable drives 310 may be coupled to the first axle section 222 or the second axle section 224 of the axle 220. For example, the input pulleys 312 may be coupled to the first axle section 222 or the second axle section 224 to receive power from the first axle section 222 or the second axle section 224. As another example, the input pulley 312 may be coupled to the axle 220 to receive power from the operator controls 132 via the drive system 202. As yet another example, the axle 220 may be operatively coupled to the input pulley 312 (e.g., a first input pulley) of a first of the continuously-variable drives 310 and to the input pulley 312 (e.g., a second input pulley) of a second of the continuously-variable drives 310. The input pulley 312 is driven by the axle 220 to transfer power from the axle 220 to the input pulley 312. In some examples, as the input pulley 312 is driven by the axle 220, the input pulley 312 rotates about the third axis $A_3$ (shown in FIG. 2). In some examples, the input pulley 312 is at least partially arranged within the raised tandem housing opening portion 306 of the tandem housing opening 302.

The continuously-variable drives 310 each include a belt 316 (e.g., a torque transfer belt) operatively connecting the input pulley 312 to the output pulley 314. For example, the belt 316 may engage the input pulley 312 and the output pulley 314 to transfer power from the input pulley 312 to the output pulley 314. In some examples, the output pulley 314 is driven by the input pulley 312 via the belt 316. The output pulley 314 rotates about a fourth axis $A_4$ offset from the third axis $A_3$ (shown in FIG. 2). The fourth axis $A_4$ may be substantially parallel to the third axis $A_3$. The fourth axis $A_4$ may be vertically offset from the third axis $A_3$. For example, the third axis $A_3$ may be positioned higher in a vertical direction than the fourth axis $A_4$. As another example, a first center of the input pulley 312 may be vertically offset from a second center of the output pulley 314.

In some examples, the continuously-variable drives 310 each include additional output pulleys 314 and belts 316 (shown in FIG. 4). For example, the continuously-variable drives 310 may include a first of the output pulleys 314 for providing power to a first of the rear wheels 110, a first of the belts 316 operatively connecting the input pulley 312 to the first of the output pulleys 314, a second of the output pulleys 314 (shown in dashed line) for providing power to a second of the rear wheels 110, and a second of the belts 316 (shown in dashed line) operatively connecting the input pulley 312 to the second of the output pulleys 314. The additional belt 316 may operatively connect the additional output pulley 314 to the input pulley 312 separately from the belt 316 operatively connecting the output pulley 314 to the input pulley 312.

The continuously-variable drives 310 selectively adjust the gear ratio between axle 220 and the rear wheels 110 by adjusting the gear ratio between the input pulleys 312 and the output pulleys 314. The continuously-variable drives 310 may adjust the gear ratio between the input pulleys 312 and the output pulleys 314 by selectively adjusting the belts 316 between different diameters of the input pulleys 312 and the output pulleys 314. For example, when the belt 316 is positioned on a first input diameter of the input pulley 312 and a first output diameter of the output pulley 314, the continuously-variable drive 310 may have a first effective gear ratio. When the belt 316 is positioned on a second input diameter of the input pulley 312 and a second output diameter of the output pulley 314, the continuously-variable drive 310 may have a second effective gear ratio different from the first effective gear ratio. The continuously-variable drives 310 may be selectively adjustable through various effective gear ratios between (i) a maximum effective gear ratio when the belts 316 are positioned on a maximum input diameter of the input pulley 312 and a minimum output diameter of the output pulley 314 and (ii) a minimum effective gear ratio when the belts 316 are positioned on a minimum input diameter of the input pulley 312 and a maximum output diameter of the output pulley 314.

The continuously-variable drives 310 are individually selectively adjustable between the various effective gear ratios of the continuously-variable drives 310. For example, a first effective gear ratio of a first of the continuously-variable drives 310 on a first side of the machine 100 may be separately adjusted from a second effective gear ratio of a second of the continuously-variable drives 310 on an opposing second side of the machine 100.

By individually adjusting the effective gear ratios of the continuously-variable drives 310, the rear wheels 110 attached to a first of the continuously-variable drives 310 may rotate at different speeds than the rear wheels 110 attached to a second of the continuously-variable drives 310. As a result, the continuously-variable drives 310 may replace the functionality of a differential in the power train 200 such that the power train 200 does not include a differential between the prime mover 136 and the rear wheels 110. By eliminating the differential between the prime mover 136 and the rear wheels 110, an amount of power utilized to propel the machine 100 may be increased. For example, when the power train 200 includes a differential, a majority of the power provided by the prime mover 136 is provided to the rear wheels 110 with lesser traction, while the rear wheels 110 with greater traction are provided with less of the power from the prime mover 136, which may lead to wheelspin in the rear wheels 110 with lesser traction (e.g., spinning of the rear wheels 110 that does not propel the machine 100). However, when the power train 200 does not include the differential, the power from the prime mover 136 may be distributed to the rear wheels 110 regardless of the traction conditions of the rear wheels 110, increasing the amount of the power from the prime mover 136 that is utilized to propel the machine 100.

In some examples, the continuously-variable drives 310 each include an actuator configured to selectively adjust the continuously-variable drives 310 between different configurations to adjust the effective gear ratios of the continuously-variable drives 310. For example, the actuators of the continuously-variable drives 310 may be operated to move the belts 316 between different diameters of the input pulleys 312 and the output pulleys 314 to change the effective gear ratios of the continuously-variable drives 310. In other examples, the continuously-variable drives 310 are passive continuously-variable transmissions that passively adjust the effective gear ratios of the continuously-variable drives 310.

The tandem drive assemblies 111 each include drive sprockets 320 arranged in the tandem housing opening 302 of the tandem housings 300. The drive sprockets 320 are each coupled to one of the rear wheels 110. For example, one of the tandem drive assemblies 111 on a side of the machine 100 may include a first of the drive sprockets 320 coupled to a first of a pair of the rear wheels 110 on the side of the machine 100 and a second of the drive sprockets 320 coupled to a second of the pair of the rear wheels 110 on the side of the machine 100.

The drive sprockets 320 are each coupled to the output pulley 314 of the continuously-variable drive 310. For example, a first of the drive sprockets 320 may be directly coupled to the output pulley 314 to receive power from the output pulley 314 and a second of the drive sprockets 320 may be indirectly coupled (e.g., coupled via the first of the drive sprockets 320, coupled via a chain, coupled via a belt) to the output pulley 314 to receive power from the output pulley 314. As another example, each of the drive sprockets 320 may be indirectly coupled to the output pulley 314 to receive power from the output pulley 314. In other examples, when the continuously-variable drive 310 includes multiple output pulleys 314, the drive sprockets 320 are each coupled to one of the output pulleys 314 of the continuously-variable drive 310. For example, a first of the drive sprockets 320 may be directly coupled to a first of the output pulleys 314 of the continuously-variable drive 310 and a second of the drive sprockets 320 may be directly coupled to a second of the output pulleys 314 of the continuously-variable drive 310.

In some examples, the drive sprockets 320 of each of the tandem drive assemblies 111 include a first drive sprocket 322 (e.g., a forward drive sprocket) coupled to the continuously-variable drive 310 of the tandem drive assemblies 111, a second drive sprocket 324 (e.g., a rearward drive sprocket), and a chain 326 (e.g., a torque transfer chain) operatively connecting the second drive sprocket 324 to the first drive sprocket 322. The first drive sprocket 322 may be coupled to and co-axial with the output pulley 314 of the continuously-variable drive 310. For example, the chain 326 may engage the first drive sprocket 322 and the second drive sprocket 324 to transfer power received by the first drive sprocket 322 from the continuously-variable drive 310 to the second drive sprocket 324 such that the first drive sprocket 322 transfers power to a first of the rear wheels 110 coupled to the first drive sprocket 322 and the second drive sprocket 324 transfers power to a second of the rear wheels 110 coupled to the second drive sprocket 324. In other examples, the first drive sprocket 322 is operatively connected to the second drive sprocket 324 through other means (e.g., a belt, a geartrain). In still other embodiments, each of the first drive sprocket 322 and the second drive sprocket 324 are independently operatively connected to the continuously-variable drives 310. For example, a first chain may operatively connect the first drive sprocket 322 to the continuously-variable drive 310 to transfer power from the continuously-variable drive 310 to the first drive sprocket 322 and a second chain may operatively connect the second drive sprocket 324 to the continuously-variable drive 310 to transfer power from the continuously-variable drive 310 to the second drive sprocket 324.

As indicated above, FIGS. 3 and 4 are provided as an example. Other examples may differ from what is described with regard to FIGS. 3 and 4.

Figure 5:
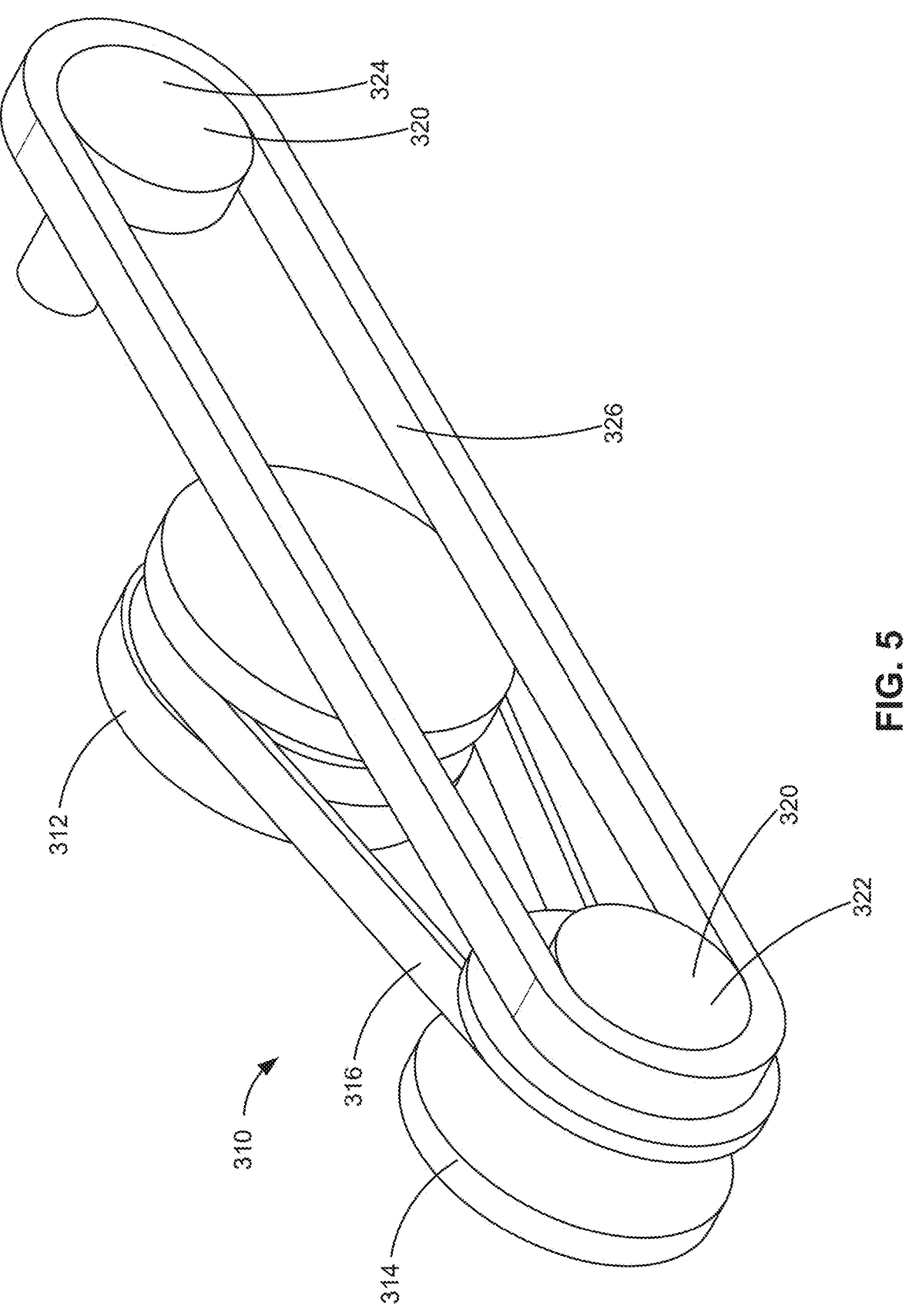
FIG. 5 is a perspective view of a portion of the tandem drive assembly of FIG. 3.

FIG. 5 is a perspective view of a portion of one of the tandem drive assemblies 111.

The tandem drive assemblies 111 includes the continuously-variable drive 310, the drive sprockets 320, and the chain 326. The continuously-variable drive 310 includes the input pulley 312, the output pulley 314, and the belt 316 operatively connecting the output pulley 314 and the input pulley 312. The drive sprockets 320 include the first drive sprocket 322 and the second drive sprocket 324. The first drive sprocket 322 is attached to the output pulley 314 to receive power from the continuously-variable drives 310. The chain 326 operatively connects the second drive sprocket 324 to the first drive sprocket 322 such that the second drive sprocket 324 may receive power from the continuously-variable drives 310 via the first drive sprocket 322 and the chain 326.

As indicated above, FIG. 5 is provided as an example. Other examples may differ from what is described with regard to FIG. 5.

Figure 6:
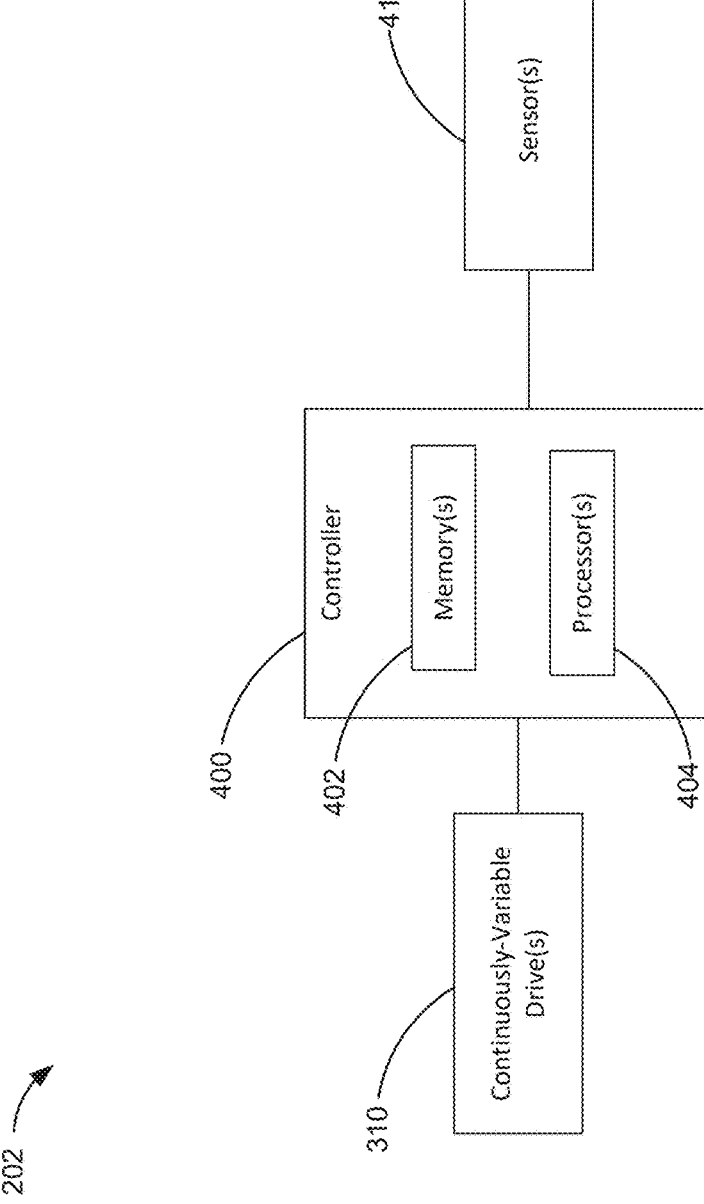
FIG. 6 is a block diagram of an example drive system of the power train of FIG. 2.

FIG. 6 shows a block diagram of an example of the drive system 202. The drive system 202 includes the continuously-variable drives 310.

The drive system 202 includes a controller 400. The controller 400 may include one or more memories 402 and one or more processors 404 communicatively coupled to the one or more memories 402. The processors 404 may include a central processing unit, a graphics processing unit, a microprocessor, a controller, a microcontroller, a digital signal processor, a field-programmable gate array, an application-specific integrated circuit, and/or another type of processing component. The processor 404 may be implemented in hardware, firmware, or a combination of hardware and software. The processor 404 may be capable of being programmed to perform one or more operations or processes described elsewhere herein. The memories 402 may include volatile and/or nonvolatile memory. For example, the memory 402 may include random access memory (RAM), read only memory (ROM), a hard disk drive, and/or another type of memory (e.g., a flash memory, a magnetic memory, and/or an optical memory). The memory 402 may be a non-transitory computer-readable medium. The memory 402 may store information, one or more instructions, and/or software (e.g., one or more software applications) related to the operation of the controller 400. The controller 400 may be configured to perform one or more operations described herein.

The controller 400 is communicably coupled to the continuously-variable drives 310. For example, the controller 400 may be communicably coupled to the continuously-variable drives 310 via a wired connection. As another example, the controller 400 may be communicably coupled to the continuously-variable drives 310 via a wireless connection (e.g., a wireless network, Bluetooth, a local area network). The controller 400 may provide transmit commands (e.g., control signals) to the continuously-variable drives 310 to operate the continuously-variable drives 310.

The controller 400 may operate the continuously-variable drives 310 to adjust the gear ratio between the prime mover 136 and the rear wheels 110. For example, the controller 400 may provide a command to an actuator of one of the continuously-variable drives 310 that causes the actuator to adjust the effective gear ratio of the continuously-variable drive 310.

In some examples, the controller 400 may operate each of the continuously-variable drives 310 to independently adjust the effective gear ratios of each of the continuously-variable drives 310. For example, the controller 400 may transmit a first command to a first actuator of a first of the continuously-variable drives 310 that causes the first actuator to adjust a first effective gear ratio of the first of the continuously-variable drives 310 to a first value and transmit a second command to a second actuator of a second of the continuously-variable drives 310 that causes the second actuator to adjust a second effective gear ratio of the second of the continuously-variable drives 310 to a second value that is different from the first value. By independently operating the continuously-variable drives 310, the controller 400 may allow for an increase in traction of the machine 100 compared to if the continuously-variable drives 310 were not independently operated and/or if the machine 100 included a single of the continuously-variable drives 310.

In some examples, the controller 400 may operate the continuously-variable drives 310 to selectively inhibit (e.g., prevent) the transfer of power between the prime mover 136 and the rear wheels 110. For example, the continuously-variable drives 310 may include an idle configuration where the belt 316 does not operatively connect the input pulley 312 and the output pulley 314 (e.g., the belt 316 is slack) such that the input pulley 312 does not transfer power to the output pulley 314. The controller 400 may independently operate the continuously-variable drives 310 to inhibit the transfer of power between the prime mover 136 and portions of the rear wheels 110. For example, the controller 400 may operate a first of the continuously-variable drives 310 on a first side of the machine 100 to prevent the first of the continuously-variable drives 310 from providing power from the prime mover 136 to the rear wheels 110 on the first side of the machine 100 while operating a second of the continuously-variable drives 310 on an opposing second side of the machine 100 with an effective gear ratio that provides power from the prime mover 136 to the rear wheels 110 on the second side of the machine 100. This may enable the machine 100 to make sharp (e.g., zero-point) turns.

The drive system 202 includes one or more sensors 410. The sensors 410 are communicably coupled to the controller 400. The sensors 410 may include various sensors positioned about the machine 100 to acquire sensor data regarding operation of the drive system 202. For example, the sensors 410 may include an accelerometer, a suspension sensor, wheel sensors, a camera, and/or other sensors to facilitate acquiring sensor data regarding operation of the drive system 202. In some examples, one or more of sensors 410 are configured to facilitate detecting and obtaining sensor data including angular offset data corresponding to the angular offset between the first axle section 222 and the second axle section 224 facilitated by the torsional damper 230. For example, one of the sensors 410 may be coupled to the torsional damper 230 and configured to facilitate detecting and obtaining the angular offset data corresponding to the angular offset between the first axle section 222 and the second axle section 224 based on a strain within the torsional damper 230. As another example, one of the sensors 410 may include a first portion coupled to the first axle section 222 and a second portion coupled to the second axle section 224 and be configured to facilitate detecting and obtaining the angular offset data corresponding to the angular offset between the first axle section 222 and the second axle section 224 based on an offset between the first portion of the sensor 410 and the second portion of the sensor 410. In some examples, one or more of the sensors 410 are configured to facilitate detecting and obtaining sensor data corresponding to a steering angle of the machine 100. In other examples, one or more of sensors 410 are configured to facilitate detecting and obtaining sensor data including a speed and/or a torque at the axle 220 and/or the rear wheels 110.

The controller 400 may obtain the sensor data from the sensors 410. For example, the controller 400 may receive the sensor data from the sensors 410 including an angular offset between the first axle section 222 and the second axle section 224. The controller 400 may determine the angular offset between the first axle section 222 and the second axle section 224 based on the sensor data. For example, the controller 400 may acquire sensor data from the sensors 410 indicating a strain value in the torsional damper 230. The controller 400 may determine the angular offset between the first axle section 222 and the second axle section 224 based on the strain value in the torsional damper 230.

The controller 400 may operate at least one of the continuously-variable drives 310 based on the sensor data to adjust the effective gear ratio of the at least one of the continuously-variable drives 310. For example, if the sensor data indicates that there is an angular offset between the first axle section 222 coupled to a first of the continuously-variable drives 310 and the second axle section 224 coupled to a second of the continuously-variable drives 310, the controller 400 may transmit at least one command to the first of the continuously-variable drives 310 and/or the second of the continuously-variable drives 310 to adjust the effective gear ratio of the first of the continuously-variable drives 310 and/or the second of the continuously-variable drives 310 to reduce the angular offset between the first axle section 222 and the second axle section 224. In other examples, the controller 400 may monitor a speed and/or a torque at the axle 220 and/or the rear wheels 110 (e.g., in real time), and the controller 400 may transmit at least one command to the first of the continuously-variable drives 310 and/or the second of the continuously-variable drives 310 to adjust the effective gear ratio of the first of the continuously-variable drives 310 and/or the second of the continuously-variable drives 310 to adjust speed and/or torque (e.g., to compensate for steering, terrain changes, or the like).

In some examples, the controller 400 may operate the at least one of the continuously-variable drives 310 based on input data and/or the sensor data received by the controller 400 from the sensors 410 to adjust the effective gear ratio of the at least one of the continuously-variable drives 310. For example, the controller 400 may receive input data from an operator of the machine 100 via the console 130 and/or the sensors 410 corresponding to operator commanded speed and/or operator commanded steering of the machine 100. The controller 400 may transmit at least one command to the first of the continuously-variable drives 310 and/or the second of the continuously-variable drives 310 to adjust the effective gear ratio of the first of the continuously-variable drives 310 and/or the second of the continuously-variable drives 310 based on the input data received from the console 130 and/or the sensor data received from the sensors 410 to achieve the operator commanded speed and/or the operator commanded steering of the machine 100.

As indicated above, FIG. 6 is provided as an example. Other examples may differ from what is described with regard to FIG. 6.

INDUSTRIAL APPLICABILITY

The drive system 202 described herein may be used with any machine 100 that uses a tandem drive. For example, the drive system 202 may be used with a motor grader to operate a pair of rear wheels 110 of the motor grader. Accordingly, the drive system 202 may facilitate machine propulsion, steering, and traction for earth-moving activities, such as for construction or road preparation. Generally, a drive system may have difficulty providing power to the rear wheels 110 on a first side of the motor grader that have higher traction with a ground surface relative to the rear wheels 110 on a second side of the motor grader that have a lower traction with the ground surface. Additionally or alternatively, a drive system may occupy a region of the motor grader that interferes with other systems (e.g., a hydraulic system 138) of the motor grader.

The drive system 202 described herein provides individualized control over the pairs of tandem wheels 110 on opposite sides of the machine 100. For example, because each pair of tandem wheels 110 is controlled by a separate continuously-variable drive 310, independent gear ratio, speed, and/or torque commands can be dynamically issued for the opposite sides of the machine 100. This improves overall control of the machine 100, and in particular, provides for improved steering, turning, and traction. In addition, positioning the continuously-variable drive 310 in the tandem drive assembly 111, where it is closer to the wheels 110, reduces power loss and enables faster response and improved control. Moreover, this configuration can free up space in a compartment that houses the prime mover 136 (e.g., where the transmission would otherwise be located), which can be used more efficiently by other systems or connections of the machine 100 (e.g., the hydraulic system 138). Alternatively, the compartment may be reduced in size, thereby improving sightlines and reducing a weight of the machine 100.

The foregoing describes only some embodiments, and alterations, modifications, additions and/or changes can be made thereto without departing from the scope and spirit of the disclosed embodiments, the embodiments being illustrative and not restrictive. Furthermore, implementations are not limited to the disclosed embodiments, and may cover various modifications and equivalent arrangements included within the spirit and scope of the disclosed embodiments. Also, the various embodiments described above may be implemented in conjunction with other embodiments, for example, aspects of one embodiment may be combined with aspects of another embodiment to realize yet other embodiments. Further, each independent feature or component of any given assembly or process may constitute an additional embodiment. As used herein, the singular forms of "a," "an," and "the" include plural referents unless the context clearly dictates otherwise. In addition, as used herein, the term "or" means "and/or" unless the context clearly dictates otherwise.

When "a controller" or "one or more controllers" is described or claimed (within a single claim or across multiple claims) as performing multiple operations or being configured to perform multiple operations, unless described or claimed otherwise (e.g., via the use of "first controller" and "second controller" or other language that differentiates controllers) this language is intended to cover a single controller performing or being configured to perform all of the operations, a group of controllers collectively performing or being configured to perform all of the operations, a first controller performing or being configured to perform a first operation and a second controller performing or being configured to perform a second operation, or any combination of controllers performing or being configured to perform the operations.

Further, spatially relative terms, such as "upper," "lower," "top," "bottom," "left," "right," etc., may be used herein to describe one element or feature's relationship to another element(s) or feature(s) as illustrated in the figures. The spatially relative terms are intended to encompass different orientations in use or operation in addition to the orientation(s) depicted in the figures. Accordingly, the spatially relative terms may be interpreted in a corresponding manner to rotations of the orientation(s) depicted in the figures.

What is claimed is:

1. A tandem drive assembly, comprising:
a tandem housing;
a first drive sprocket and a second drive sprocket arranged in the tandem housing and configured to engage a pair of wheels; and a continuously-variable drive, arranged in the tandem housing, comprising:
an input configured to receive power from a prime mover; and
an output coupled to the first drive sprocket, the output operatively connected to the input.

2. The tandem drive assembly of claim 1, further comprising:
a chain operatively connecting the first drive sprocket and the second drive sprocket.

3. The tandem drive assembly of claim 1, further comprising:
an additional output coupled to the second drive sprocket, the additional output operatively connected to the input separately from the output.

4. The tandem drive assembly of claim 1, wherein the input is an input pulley,
wherein the output is an output pulley operatively connected to the input pulley by a belt,
wherein the first drive sprocket and the output pulley are co-axial, and
wherein a first center of the input pulley is vertically offset from a second center of the output pulley.

5. A drive system, comprising:
a first tandem drive assembly, comprising:
a first continuously-variable drive, comprising:
a first input; and
a first output operatively connected to the first input;
a second tandem drive assembly, comprising:
a second continuously-variable drive, comprising:
a second input; and
a second output operatively connected to the second input; and
an axle operatively coupled to the first input and the second input.

6. The drive system of claim 5, wherein the axle comprises a first axle section coupled to the first input, and a second axle section coupled to the second input, and
wherein the drive system further comprises a torsional damper coupling the first axle section and the second axle section.

7. The drive system of claim 6, further comprising a bevel gear assembly configured to provide power from a prime mover to the axle, the bevel gear assembly coupled to the first axle section.

8. The drive system of claim 6, further comprising:
a sensor coupled to the torsional damper and configured to acquire sensor data indicating an angular offset between the first axle section and the second axle section.

9. The drive system of claim 8, further comprising:
a controller configured to:
obtain, from the sensor, the sensor data indicating the angular offset; and
transmit respective commands to the first continuously-variable drive and the second continuously-variable drive based on the sensor data to adjust effective gearing ratios of the first continuously-variable drive and the second continuously-variable drive.

10. The drive system of claim 9, wherein a first command transmitted to the first continuously-variable drive is to adjust the first continuously-variable drive into a first configuration with a first effective gear ratio, and a second command transmitted to the second continuously-variable drive is to adjust the second continuously-variable drive into a second configuration with a second effective gear ratio.

11. The drive system of claim 9, wherein the respective commands transmitted to the first continuously-variable drive and the second continuously-variable drive reduce the angular offset between the first axle section and the second axle section.

12. The drive system of claim 5, further comprising:

a controller configured to:

transmit a first command to the first continuously-variable drive to adjust a first effective gear ratio of the first continuously-variable drive; and transmit a second command to the second continuously-variable drive to adjust a second effective gear ratio of the second continuously-variable drive independently of the first effective gear ratio of the first continuously-variable drive.

13. The drive system of claim 12, wherein the first command adjusts the first effective gear ratio of the first continuously-variable drive to a first value, and the second command adjusts the second effective gear ratio of the second continuously-variable drive to a second value, the second value different from the first value.

14. The drive system of claim 5, wherein the first tandem drive assembly further comprises:

a first tandem housing positioned on a first side of the drive system, the first tandem housing defining a first tandem housing opening that receives the first continuously-variable drive, and wherein the second tandem drive assembly further comprises:

a second tandem housing positioned on an opposing second side of the drive system, the second tandem housing defining a second tandem housing opening that receives the second continuously-variable drive.

15. The drive system of claim 14, wherein the first tandem housing and the second tandem housing collectively define a region positioned between the first tandem housing and the second tandem housing, and wherein the first continuously-variable drive and the second continuously-variable drive are positioned outside of the region.

16. A motor grader, comprising:

a steerable front portion coupled to a driven rear portion;

a prime mover supported on the driven rear portion;

a pair of rear wheels supporting the driven rear portion; and a tandem drive assembly, comprising:

a tandem housing;

a first drive sprocket and a second drive sprocket arranged in the tandem housing and engaging the pair of rear wheels; and a continuously-variable drive arranged in the tandem housing, the continuously-variable drive configured to receive power from the prime mover and configured to drive at least one of the first drive sprocket or the second drive sprocket.

17. The motor grader of claim 16, wherein the continuously-variable drive comprises:

an input pulley configured to receive power from the prime mover;

an output pulley coupled to the first drive sprocket; and a belt operatively connecting the input pulley to the output pulley.

18. The motor grader of claim 17, wherein the tandem drive assembly further comprises a chain operatively connecting the first drive sprocket and the second drive sprocket.

19. The motor grader of claim 16, further comprising:

a controller configured to transmit commands to the continuously-variable drive to adjust a gear ratio between the prime mover and at least one of the first drive sprocket or the second drive sprocket.

20. The motor grader of claim 16, further comprising:

an axle configured to receive power from the prime mover, the axle connected to the continuously-variable drive at an end of the axle to provide power received from the prime mover to the continuously-variable drive.

\* \* \* \* \*